(12) United States Patent
Hageman

(10) Patent No.: US 7,173,186 B1
(45) Date of Patent: Feb. 6, 2007

(54) DUAL-SIDED MOUNTING BRACKET FOR ELECTRICAL JUNCTION BOXES AND METHOD

(76) Inventor: Dale A. Hageman, 4313 Sharpshooter La., North Las Vegas, NV (US) 89031

( * ) Notice: Subject to any disclaimer, the term of this patent is extended or adjusted under 35 U.S.C. 154(b) by 0 days.

(21) Appl. No.: 11/356,836

(22) Filed: Feb. 21, 2006

(51) Int. Cl.
*H01R 13/46* (2006.01)

(52) U.S. Cl. .......................... 174/58; 174/57; 174/61; 174/63; 248/906

(58) Field of Classification Search ............... 174/480, 174/481, 50, 53, 54, 57, 58, 61, 62, 63; 220/3.2, 220/3.3, 3.4, 3.5, 3.6, 3.7, 3.8, 3.9, 4.02; 248/343, 906, 228.6, 121, 127, 200, 220.1, 248/207, 205.2; 211/26, 86.01
See application file for complete search history.

(56) References Cited

U.S. PATENT DOCUMENTS

| | | | | |
|---|---|---|---|---|
| 1,592,990 A | * | 7/1926 | Raquette et al. ............ 248/906 |
| 2,316,389 A | * | 4/1943 | Atkinson .................... 248/906 |
| 2,875,915 A | * | 3/1959 | Buckels ...................... 220/3.7 |
| 4,757,967 A | * | 7/1988 | Delmore et al. ............ 248/906 |
| 4,967,990 A | * | 11/1990 | Rinderer .................... 248/906 |
| D342,938 S | * | 1/1994 | Cheatham .................. D13/154 |
| 5,386,959 A | * | 2/1995 | Laughlin et al. ............ 248/906 |
| 5,405,111 A | * | 4/1995 | Medlin, Jr. ................. 248/906 |
| 5,839,594 A | * | 11/1998 | Barbour ...................... 220/3.7 |
| 5,841,068 A | * | 11/1998 | Umstead et al. ............. 174/58 |
| 5,931,425 A | * | 8/1999 | Oliva .......................... 174/58 |
| 6,484,980 B2 | * | 11/2002 | Medlin et al. ............. 248/906 |
| 6,774,307 B2 | * | 8/2004 | Kruse et al. .................. 174/53 |

* cited by examiner

*Primary Examiner*—Angel R. Estrada
(74) *Attorney, Agent, or Firm*—Janine Rickman Novatt; Harry M. Weiss; Weiss & Moy, P.C.

(57) ABSTRACT

A mounting bracket for electrical junction boxes has two sides to which electrical junction boxes for adjacent rooms may be attached. The mounting bracket is interposed between parallel vertical stud members. A plurality of electrical junction boxes may be attached to either side of the mounting bracket.

15 Claims, 1 Drawing Sheet

DUAL-SIDED MOUNTING BRACKET FOR ELECTRICAL JUNCTION BOXES AND METHOD

FIELD OF THE INVENTION

This invention relates generally to mounting brackets for electrical junction boxes and, more particular, to a mounting bracket to which more than one electrical junction box may be attached for one room and/or adjacent rooms.

BACKGROUND OF THE INVENTION

The present invention concerns electrical junction boxes. Junction boxes, into which a variety of devices (such as switches and plug receptacles) may be installed, are usually positioned in the hollow space within a wall so as to be accessible through an opening in the wall. The junction box must be secured in position in some suitable fashion. The junction box may be attached directly, or mounting brackets may be employed for such a purpose. The junction box itself or, where utilized, the mounting bracket, is attached to a stud member, usually a two-by-four.

A limitation in the prior art approaches is that they facilitate the securing of a junction box for a single room only. Thus, in the event that another electrical junction box is desired for an adjacent room, for example, it would be necessary to utilize another mounting structure. The additional mounting structure would need to be attached at a different attachment point on the same stud member or on a different stud member altogether. This requires additional effort and may require additional materials.

A need therefore exists for a mounting bracket device to which more than one electrical junction box may be attached for adjacent rooms.

The present invention satisfies these needs and provides other, related advantages.

SUMMARY OF THE INVENTION

In accordance with an embodiment of the present invention, a mounting bracket device is disclosed. The device comprises: a first stud coupling member; a second stud coupling member; a first junction box receiving section adjacent the first stud coupling member; a second junction box receiving section adjacent the second stud coupling member; and an offsetting center portion interposed between the first junction box receiving section and the second junction box receiving section; wherein a first junction box coupled to the first junction box receiving section wilt open in a first direction and a second junction box coupled to the second junction box receiving section will open in a second direction that is opposite the first direction.

In accordance with another embodiment of the present invention, a mounting bracket system is disclosed. The system comprises, in combination: a first stud coupling member; a second stud coupling member; a first junction box receiving section adjacent the first stud coupling member; a second junction box receiving section adjacent the second stud coupling member; and an offsetting center portion interposed between the first junction box receiving section and the second junction box receiving section; a first electrical junction box coupled to the first junction box receiving section, oriented in a first direction; and a second electrical junction box coupled to the second junction box receiving section, oriented in a second direction that is opposite the first direction.

In accordance with a further embodiment of the present invention, a method for installing electrical junction boxes is disclosed. The method comprises: providing a dual-sided mounting bracket for electrical junction boxes comprising: a first stud coupling member, a second stud coupling member, a first junction box receiving section adjacent the first stud coupling member, a second junction box receiving section adjacent the second stud coupling member, and an offsetting center portion interposed between the first junction box receiving section and the second junction box receiving section; coupling electrical junction boxes to the mounting bracket; interposing the mounting bracket containing the electrical junction boxes between two parallel vertical stud members in a hollow space of an interior portion of a wall; and coupling the mounting bracket to the stud members.

DETAILED DESCRIPTION OF THE PREFERRED EMBODIMENTS

Figure 1:
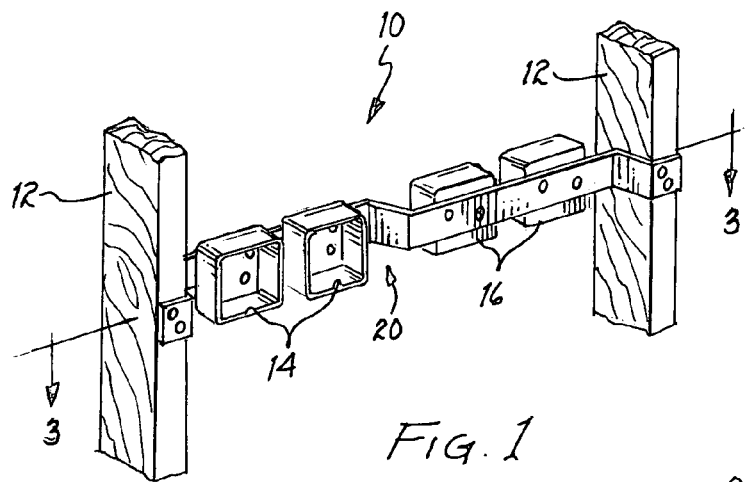
FIG. 1 is a perspective view of a mounting bracket device with electrical junction boxes attached thereto, as installed on parallel vertical stud members, consistent with an embodiment of the present invention.
Figure 2:
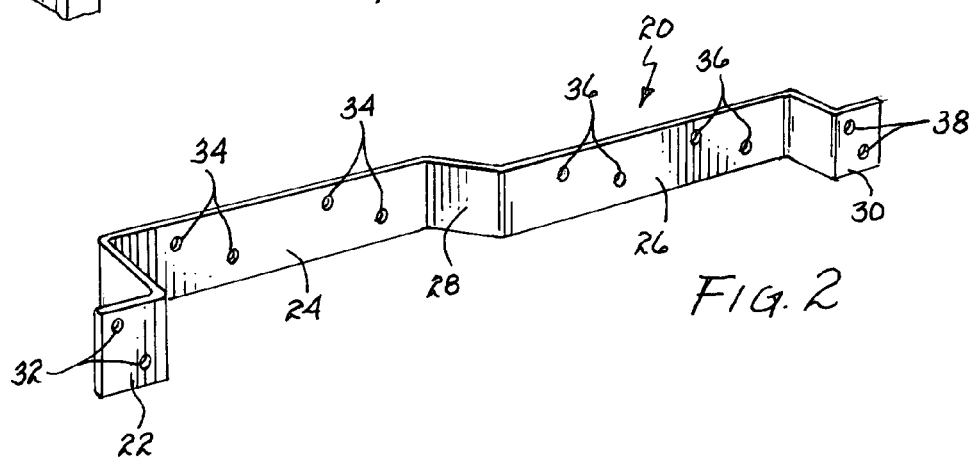
FIG. 2 is a perspective view of a mounting bracket device, consistent with an embodiment of the present invention.

Referring first to FIG. 2, a mounting bracket 20 consistent with an embodiment of the present invention is shown and described. In this embodiment, the mounting bracket 20 comprises a first stud coupling member 22, a first junction box receiving section 24, a second junction box receiving section 26, an offsetting center portion 28 interposed between the first junction box receiving section 24 and the second junction box receiving section 26, and a second stud coupling member 30. The mounting bracket 20 should preferably be composed of metal, plastic, or some other desired rigid material, so as to hold electrical junction boxes 14 and 16 (as best seen in FIG. 1) firmly in position between stud members 12. Preferably, the mounting bracket 20 is of a length suitable for adjacent stud members 12 that are spaced twelve, sixteen, or twenty-four inches apart, but the mounting bracket 20 may be of some other desired length.

Figure 3:
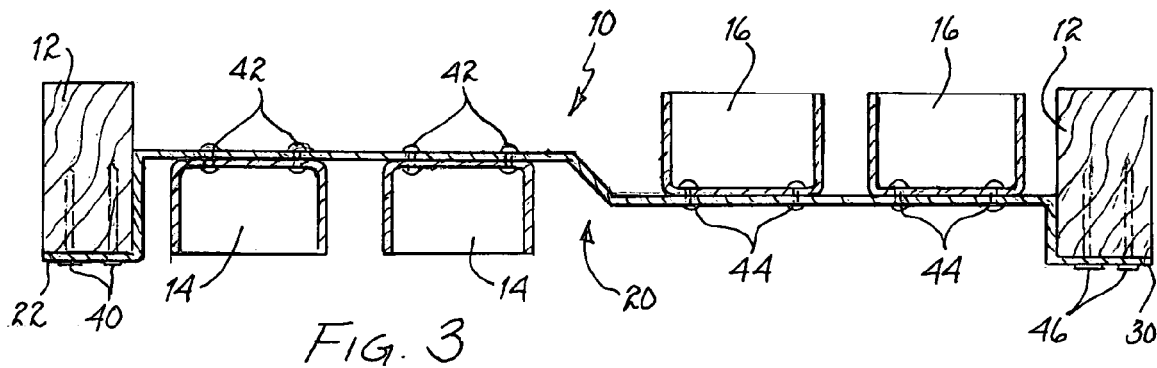
FIG. 3 is a cross sectional view taken through line 3—3 of the mounting bracket device of FIG. 1.

The purpose of the offsetting portion 28 of the mounting bracket 20 is to offset the planar sections 24 and 26, so that when the electrical junction boxes 14 and 16 are attached to the mounting bracket 20, the open stud coupling members of the electrical junction boxes 14 and 16 will be exposed through opposing wall surfaces (not shown). In one embodiment, the first stud coupling member 22 and the second stud coupling member 30 are L-shaped, allowing them to be secured to a short side of the stud members 12, as best seen in FIGS. 1 and 3, via openings 32 and 38, respectively. Preferably, the first stud coupling member 22 and the second stud coupling member 30 face the same direction, so as to allow for a more rapid installation of the mounting bracket 20 to the stud members 12 by a person standing on one side of the studs 12 in a first room. However, it may be desired for the first stud coupling member 22 and the second stud coupling member 30 to face opposite directions, with one being coupled on one side of the studs 12 in a first room, and the second being coupled on the other side of the studs 12 in a second room. It should also be noted that it may be possible to provide stud coupling members 22 and 30 that are I-shaped rather than L-shaped, so that securing occurs along long sides of the studs 12 rather than short sides of the studs 12.

Referring now to FIG. 1, the main components involved in an electrical junction box assembly 10 consistent with an embodiment of the present invention are shown. These include two parallel vertical stud members 12, a mounting bracket 20 secured to the stud members 12 in a horizontal position, and electrical junction boxes 14 and 16 secured to the mounting bracket 20. The electrical junction boxes 14 are secured to a first side of the mounting bracket 20 in a first direction and the electrical junction boxes 16 are secured to a second side of the mounting bracket 20 in a second direction that is opposite the first direction. In this way, the electrical junction boxes 14 may be used for a room on a first side of the mounting bracket 20 and the electrical junction boxes 16 may be used for a room on the second side of the mounting bracket 20. In this embodiment, a total of four electrical junction boxes 14 and 16 are secured to the mounting bracket 20, but more or less electrical junction boxes 14 and 16 could be used, as desired.

With respect to attachment of the electrical junction boxes 14 and 16 to the mounting bracket 20, as best seen in FIGS. 2 and 3, it is preferred to provide on the mounting bracket 20 a plurality of openings 34 and 36 through which coupling means 42 and 44, such as bolts, may be inserted so as to couple the electrical junction boxes 14 and 16 to the mounting bracket 20. This permits positioning of the electrical junction boxes 14 and 16 onto the mounting bracket 20, and the securing of the electrical junction boxes 14 and 16 in position by the insertion of coupling means 42 and 44 through the openings 34 and 36 and through pre-existing openings in the electrical junction boxes 14 and 16. Other coupling means, such as tabs and tab slots, for example, may also be utilized to facilitate coupling of the junction boxes 14 and 16 to the mounting bracket 20.

With respect to attachment of the mounting bracket 20 to the stud members 12, as best seen in FIGS. 1–3, it is preferred to provide on the mounting bracket 20 a plurality of openings 32 and 38, through which nails 40 and 46 or some other type of coupling means, such as screws, may be inserted so as to couple the mounting bracket 20 to the stud members 12. This permits interpositioning of the mounting bracket 20 between the stud members 12, and the securing of the mounting bracket 20 in position by insertion of the nails 40 and 46 through the openings 32 and 38 and into the stud members 12. The mounting bracket 20 should be secured in an orientation so that it is horizontal to a floor below. As best seen in FIGS. 1 and 3, the mounting bracket 20 is preferably attached to the stud members 12 in such a way so that the first stud coupling member 22 and second stud coupling member 30 of the mounting bracket 20 each abut snugly against a corner of the stud members 12. In this way, the positioning of the mounting bracket 20 should not unduly interfere with the outer dimensions of the stud members 12, and thereby, not interfere with the application of drywall, for example, to the stud members 12.

While the invention has been particularly shown and described with reference to the preferred embodiments thereof, it will be understood by those skilled in the art that the foregoing and other changes in form and details may be made therein without departing from the spirit and scope of the invention.

STATEMENT OF OPERATION

In order to prepare the mounting bracket 20 so that it may be used for the rapid installation of electrical junction boxes 14 and 16, a user would first select a mounting bracket 20 having a length appropriate to the particular stud-spacing being utilized—whether, for example, 12 inches, 16 inches, 24 inches, etc. The user would attach the electrical junction boxes 14 and 16 to the mounting bracket 20 with coupling means 42 and 44. The user would attach the mounting bracket 20 to the stud members 12 with nails 40 and 46 inserted through openings 32 and 38 in the mounting bracket 20 and then into the stud members 12. The order of these latter two steps is not considered critical.

I claim:

1. A dual-sided mounting bracket for electrical junction boxes comprising:
    a first stud coupling member;
    a second stud coupling member;
    a first junction box receiving section adjacent the first stud coupling member;
    a second junction box receiving section adjacent the second stud coupling member; and
    an offsetting center portion interposed between the first junction box receiving section and the second junction box receiving section;
    wherein a first junction box coupled to the first junction box receiving section will open in a first direction and a second junction box coupled to the second junction box receiving section will open in a second direction that is opposite the first direction.

2. The mounting bracket of claim 1, wherein the first stud coupling member has a substantially L-shape and wherein the second stud coupling member has a substantially L-shape.

3. The mounting bracket of claim 1, wherein the first stud coupling member and the second stud coupling member have a plurality of openings adapted to receive coupling members for coupling the bracket to the stud members.

4. The mounting bracket of claim 1, wherein the first stud coupling member and the second stud coupling member each extend in the first direction.

5. The mounting bracket of claim 1, wherein the first junction box receiving section is adapted to receive two junction boxes and wherein the second junction box receiving section is adapted to receive two junction boxes.

6. A dual-sided mounting bracket system for electrical junction boxes comprising, in combination:
    a first stud coupling member;
    a second stud coupling member;
    a first junction box receiving section adjacent the first stud coupling member;
    a second junction box receiving section adjacent the second stud coupling member; and
    an offsetting center portion interposed between the first junction box receiving section and the second junction box receiving section;
    a first electrical junction box coupled to the first junction box receiving section, oriented in a first direction; and
    a second electrical junction box coupled to the second junction box receiving section, oriented in a second direction that is opposite the first direction.

7. The mounting bracket system of claim 6 wherein a plurality of electrical junction boxes are coupled to the first junction box receiving section, oriented in a first direction and a plurality of electrical junction boxes are coupled to the second junction box receiving section, oriented in a second direction that is opposite the first direction.

8. The mounting bracket system of claim 6, wherein the first stud coupling member has a substantially L-shape and wherein the second stud coupling member has a substantially L-shape.

9. The mounting bracket system of claim 6, wherein the first stud coupling member and the second stud coupling member have a plurality of openings adapted to receive coupling members for coupling the bracket to the stud members.

10. The mounting bracket system of claim 6, wherein the first stud coupling member and the second stud coupling member each extend in the first direction.

11. A method for installing electrical junction boxes comprising:
 providing a dual-sided mounting bracket for electrical junction boxes comprising:
  a first stud coupling member;
  a second stud coupling member;
  a first junction box receiving section adjacent the first stud coupling member;
  a second junction box receiving section adjacent the second stud coupling member; and
  an offsetting center portion interposed between the first junction box receiving section and the second junction box receiving section;
 coupling electrical junction boxes to the mounting bracket;
 interposing the mounting bracket containing the electrical junction boxes between two parallel vertical stud members in a hollow space of an interior portion of a wall; and
 coupling the mounting bracket to the stud members.

12. The method of claim 11, wherein the first stud coupling member has a substantially L-shape and wherein the second stud coupling member has a substantially L-shape.

13. The method of claim 11, wherein the first stud coupling member and the second stud coupling member have a plurality of openings adapted to receive coupling members for coupling the bracket to the stud members.

14. The method of claim 11, wherein the first stud coupling member and the second stud coupling member each extend in the first direction.

15. The method of claim 11, wherein the first junction box receiving section is adapted to receive two junction boxes and wherein the second junction box receiving section is adapted to receive two junction boxes and further comprising coupling two junction boxes to the first junction box receiving section and coupling two junction boxes to the second junction box receiving section.

* * * * *